Figure 1:
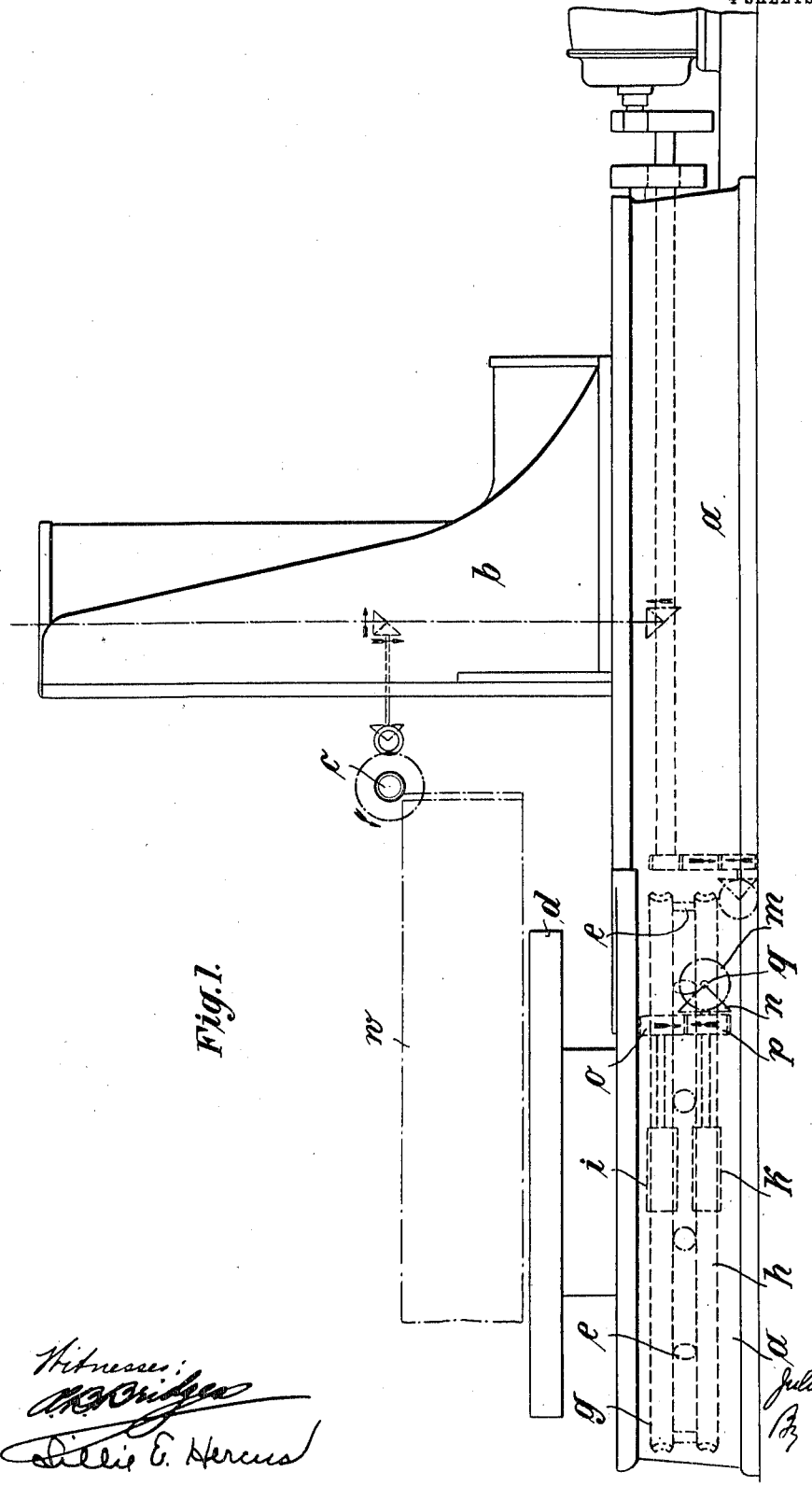

J. GRUNDSTEIN.
GEAR CUTTING MACHINE.
APPLICATION FILED JAN. 27, 1914.

1,105,649.

Patented Aug. 4, 1914.
4 SHEETS—SHEET 1.

J. GRUNDSTEIN.
GEAR CUTTING MACHINE.
APPLICATION FILED JAN. 27, 1914.

1,105,649.

Patented Aug. 4, 1914.
4 SHEETS—SHEET 4.

UNITED STATES PATENT OFFICE.

JULIUS GRUNDSTEIN, OF ETTLINGEN, GERMANY, ASSIGNOR TO MASCHINENFABRIK LORENZ, OF ETTLINGEN, GERMANY, A FIRM.

GEAR-CUTTING MACHINE.

1,105,649.  Specification of Letters Patent.  Patented Aug. 4, 1914.

Application filed January 27, 1914. Serial No. 814,731.

*To all whom it may concern:*

Be it known that I, JULIUS GRUNDSTEIN, a subject of the Emperor of Russia, residing at Ettlingen, Grand Duchy of Baden, in the German Empire, have invented certain new and useful Improvements in Gear-Cutting Machines, of which the following is a full, clear, and exact description.

In ordinary gear cutting machines working by the method of cutting gear teeth by helicoidal cutter, a worm dividing wheel is firmly connected with the table to which the work or blank is fixed. This dividing worm wheel is driven and transmits its rotation to the table. This rotation corresponds to the division which it is desired to give to the gear-wheel to be milled. This well known arrangement has the disadvantage that any faults in the worm wheel, that is to say, in the dividing wheel, which cannot be avoided, are always transmitted to the same points of the work secured to the table connected with the dividing wheel, that is to say, the faults of the dividing wheel are copied in such a manner that each tooth milled shows throughout the whole of its width the same fault of the dividing wheel. This disadvantage is obviated according to this invention which attempts to transmit each fault of the dividing wheel at each revolution to a different tooth of the blank. Each fault of the dividing wheel is not to be always transmitted over and over again to the same tooth of the work or blank, but is distributed over the whole circumference of the latter. Owing to the method of cutting gear teeth by helicoidal cutter, each single fault of the dividing wheel travels in a spiral around the whole circumference of the work. Each milled tooth of the work shows therefore throughout the whole of its width different faults of the dividing wheel, so that each face of the tooth, over the whole width of the tooth, consists of a continuous series of positive and negative faults relatively to the theoretically correct division. The faults themselves are moreover smaller at each point of the blank than the corresponding faults of the dividing wheel. This problem is solved according to this invention by producing the dividing movement of the blank, not by one dividing wheel firmly secured to it, but by two such wheels loosely mounted on the table supporting the work or blank, and driven in the same direction by separate worms to which however motion is imparted from a common driving shaft. The rotation of these two dividing wheels which are given unequal angular velocities, either owing to the fact that the driving worms have an unequal number of revolutions or owing to the number of teeth of the dividing wheels being different, or owing to both these facts, is transmitted to the table by intermediate wheels or pairs of intermediate wheels mounted to the table and engaging with the dividing wheels by means of special toothed rims. The angular speed of the intermediate wheels or pairs of intermediate wheels is the arithmetical mean of the angular velocities of the two dividing wheels, and the faults of the dividing motion are thus reduced before being transmitted to the circumference of the blank.

A construction according to this invention is diagrammatically illustrated in the accompanying drawings.

Figure 2:
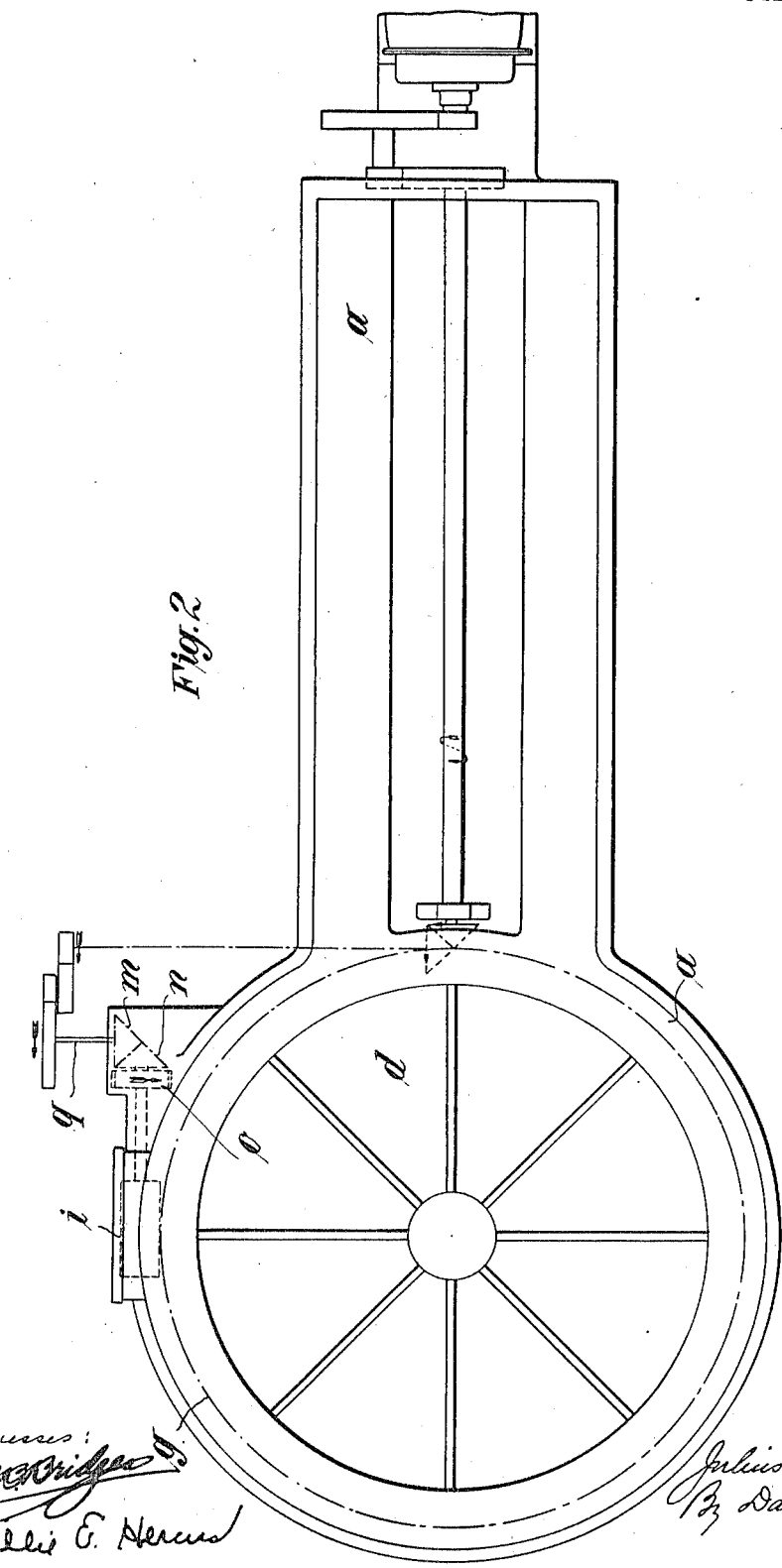
Figure 3:
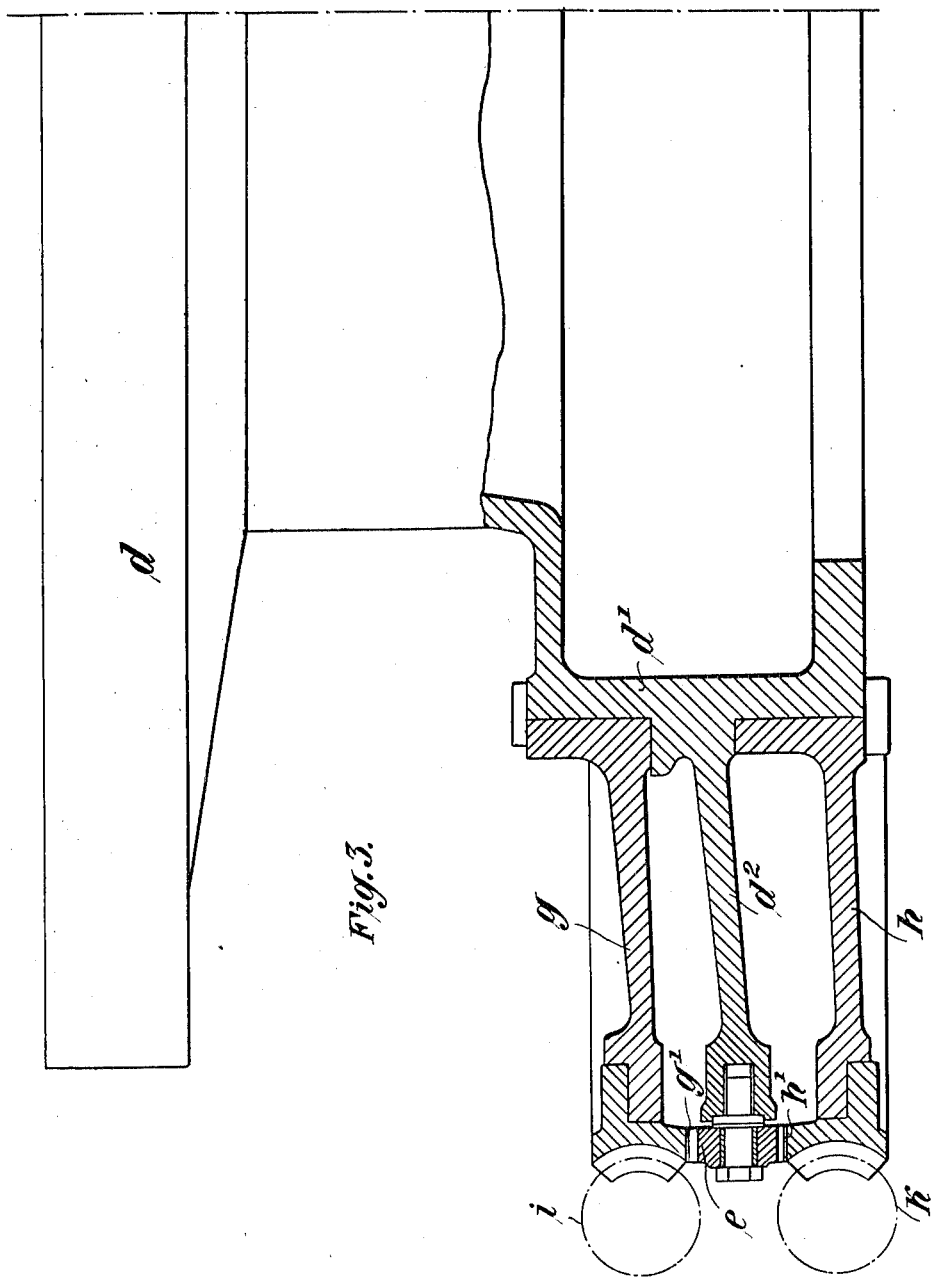
Figure 4:
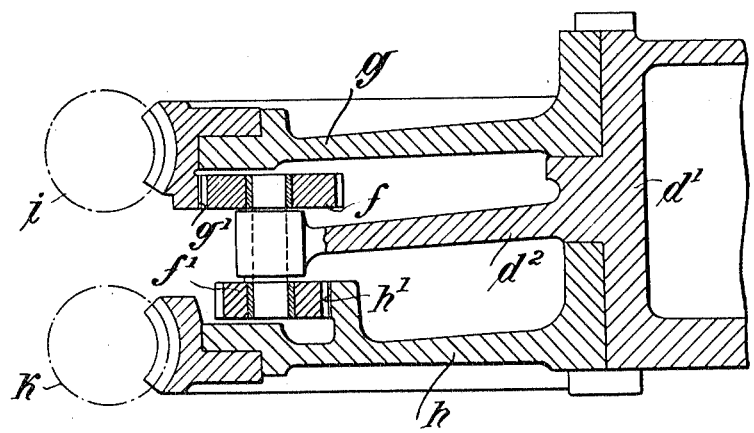
Figure 5:
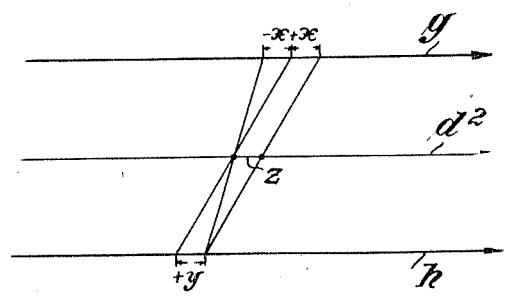

Figure 1 shows a gear wheel milling machine according to this invention, working by the method of cutting gear teeth by helicoidal cutter or worm hob, in side elevation, Fig. 2 is a plan, Fig. 3 is a vertical section, on an enlarged scale, through the lower part of the table and the two dividing wheels. Fig. 4 is a similar view to Fig. 3 and shows a somewhat modified construction for transmitting the rotation of the dividing wheels to the table. Fig. 5 is a diagram illustrating the movement of the dividing wheels and of the table relatively to each other.

Similar letters refer to similar parts throughout the several views.

The dividing device and its driving gear are arranged in well known manner in the bed $a$ of the gear cutting machine while a stand $b$ which may be adjusted to suit the diameter of the work or blank $w$ carries the milling cutter $c$ on a carriage movable in the vertical direction.

The foot $d^1$ of the table $d$ (Fig. 3) carrying the blank $w$, is rotatably mounted in the bed of the machine. The foot $d^1$ is provided with an annular flange $d^2$ carrying at the edge a series of loose intermediate wheels $e$ or of pairs of intermediate wheels $f f^1$ (Fig. 4). Above and below the annular flange $d^2$, on the foot $d^1$ of the table are mounted loosely worm wheels $g$ and $h$ forming each a dividing wheel, the said wheels being rotated in the same direction by the worms $i$ and $k$. The upper worm wheel $g$ is provided with a toothed rim $g^1$, and the lower worm-wheel $h$, with a toothed rim $h^1$. These two toothed rims engage with the intermediate wheels $e$ (Fig. 3) or with pairs of intermediate wheels $f$ and $f^1$ (Fig. 4).

The two worms $i$ and $k$ are driven by means of bevel wheels $m$ and $n$ and spur wheels $o$ and $p$ from one and the same shaft $q$. The driving of the said shaft and of the milling cutter is effected in a well known manner from one and the same source of power (for instance a pulley or electric motor). The movements of the milling cutter and the revolutions of the shaft $q$ and therefore of the dividing gear are adjustable in the known manner by means of change wheels.

The wheels $g$ and $h$ rotated by the worms $i$ and $k$ in the same direction, transmit their movement through the intermediate wheels $e$ or pairs of intermediate wheels $f$ $f^1$ to the annular flange $d^2$ and through the latter, as dividing movement, to the table and to the blank secured thereto. As the wheels $g$ and $h$ owing to their inequality and to the inequality of the worms $i$ and $k$ or of their number of revolutions, run with different angular velocities, the table and therefore the blank is given an angular speed which is the arithmetical mean of the angular speeds of the two driving dividing wheels $g$ and $h$. In that way, the unavoidable faults of the wheels $g$ and $h$ are distributed in a spiral manner over the whole circumference of the blank. Each milled flank or face of the tooth is therefore given a series of different division faults, the resultant of which approximates to theoretically exact division. The faults of division themselves are at the single points of each milled flank equal to half the sum of the two faults which coincide at the same moment on the driving dividing wheels.

From the diagram of the movement of the two wheels $g$ and $h$ and of the annular flange $d^2$ shown in Fig. 5, it follows directly that the largest fault $z$ in the toothed wheel produced is, at the highest, equal to the greatest fault $+ x$ or $+ y$ of the two dividing wheels. This most unfavorable case can only take place when the largest faults $x$ and $y$ of the two dividing wheels are equally great and coincide in time, for in that case half the sum of the two division faults $x$ and $y$ is equal to the greatest fault $z$ in the dividing wheels. In any other positions of the two dividing wheels, the resultant fault is smaller than the greatest fault in one of the said two wheels.

I claim:

1. In a machine for cutting gear teeth by a helicoidal cutter, a rotatable table, a device for transmitting the dividing movement to the table, which device consists of two dividing worm wheels loosely mounted on the table, and rotatable in the same direction but with different angular velocities, two worms meshing with said worm wheels and to which motion is imparted from a common driving shaft, the said dividing worm wheels being connected by means of special toothed rims and intermediate gearing mounted on the table.

2. In a machine for cutting gear teeth by a helicoidal cutter, a rotatable blank-holding table, a pair of dividing worm wheels rotatably mounted on the table, a worm for driving each dividing worm wheel, common driving means for the two worms, and means connecting the dividing wheels to each other and to the table whereby the table and therefore the blank is given an angular speed which is the arithmetical mean of the angular speed of the two dividing worm wheels, for the purpose set forth.

Signed a Mannheim this 2nd day of December A. D. 1913 in the presence of two witnesses.

JULIUS GRUNDSTEIN. [L. S.]

Witnesses:
  SAMUEL SHOLES BERGER,
  C. F. HINCK, Jr.